United States Patent
Shin (10) Patent No.: US 9,671,883 B2
(45) Date of Patent: Jun. 6, 2017

(54) DISPLAY DEVICE WITH INTEGRATED TOUCH SCREEN AND METHOD FOR DRIVING THE SAME

(71) Applicant: LG Display Co., Ltd., Seoul (KR)

(72) Inventor: Hee Sun Shin, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 246 days.

(21) Appl. No.: 14/133,904

(22) Filed: Dec. 19, 2013

(65) Prior Publication Data

US 2014/0184539 A1    Jul. 3, 2014

(30) Foreign Application Priority Data

Dec. 19, 2012   (KR) .......................... 10-2012-0149025

(51) Int. Cl.
   *G06F 3/041*   (2006.01)
(52) U.S. Cl.
   CPC .......... *G06F 3/0412* (2013.01); *G06F 3/0416* (2013.01)
(58) Field of Classification Search
   None
   See application file for complete search history.

(56) References Cited

U.S. PATENT DOCUMENTS

| | | |
|---|---|---|
| 2009/0135158 A1 | 5/2009 | Takahashi et al. |
| 2009/0283340 A1 | 11/2009 | Liu et al. |
| 2011/0141040 A1* | 6/2011 | Kang ................... G06F 3/0412 345/173 |
| 2012/0218199 A1 | 8/2012 | Kim et al. |
| 2012/0229419 A1* | 9/2012 | Schwartz ............. G06F 3/0418 345/174 |
| 2012/0256853 A1 | 10/2012 | Chan |
| 2012/0274603 A1 | 11/2012 | Kim et al. |

FOREIGN PATENT DOCUMENTS

| | | |
|---|---|---|
| KR | 2011-0066450 A | 6/2011 |
| KR | 2012-0037424 A | 4/2012 |

OTHER PUBLICATIONS

Office Action for Korean Patent Application No. KR 10-2015-0159525, Apr. 4, 2016, 6 Pages. (With Concise Explanation of Relevance).

\* cited by examiner

*Primary Examiner* — Ariel Balaoing
*Assistant Examiner* — Maheen Javed
(74) *Attorney, Agent, or Firm* — Fenwick & West LLP (57) ABSTRACT

Disclosed is a display device with integrated touch screen. The display device includes a panel configured to include a plurality of electrodes divided into n groups; and a display driver IC configured to, apply a common voltage to the electrodes during a display driving mode of a first frame, apply a touch scan signal to a first group and a first adjacent electrode unit included in a second group during a touch driving mode of the first frame, apply the common voltage to the electrodes during the display driving mode of a second frame, and apply the touch scan signal to the second group and a second adjacent electrode unit included in the first group adjacent to the second group during the touch driving mode of the second frame.

23 Claims, 6 Drawing Sheets

FIG. 1

Related Art

DISPLAY DEVICE WITH INTEGRATED TOUCH SCREEN AND METHOD FOR DRIVING THE SAME

CROSS-REFERENCE TO RELATED APPLICATIONS

This application claims the benefit of the Korean Patent Application No. 10-2012-0149025 filed on Dec. 19, 2012, which is hereby incorporated by reference as if fully set forth herein.

BACKGROUND

Field of the Invention

The present invention relates to a display device, and more particularly, to a display device with integrated touch screen.

Discussion of the Related Art

Touch screens are a type of input device that is included in image display devices such as liquid crystal displays (LCDs), Field Emission Displays (FEDs), plasma display panels (PDPs), electroluminescent displays (ELDs), and electrophoretic displays (EPDs), and allows a user to input predetermined information by applying a pressure (i.e., pressing or touching) to a touch sensor of a touch screen while looking at the image display device.

Particularly, the demand of display devices with integrated in-cell type touch screen, which include a plurality of built-in elements configuring the touch screen for slimming portable terminals such as smart phones and tablet Personal Computers (PCs), is recently increasing.

General display devices with integrated in-cell type touch screen transfer touch data to a system once for each one vertical sync signal (Vsync) that defines one frame period. Hereinafter, driving of a related art display device with integrated in-cell type touch screen will be described with reference to FIG. 1.

Figure 1:
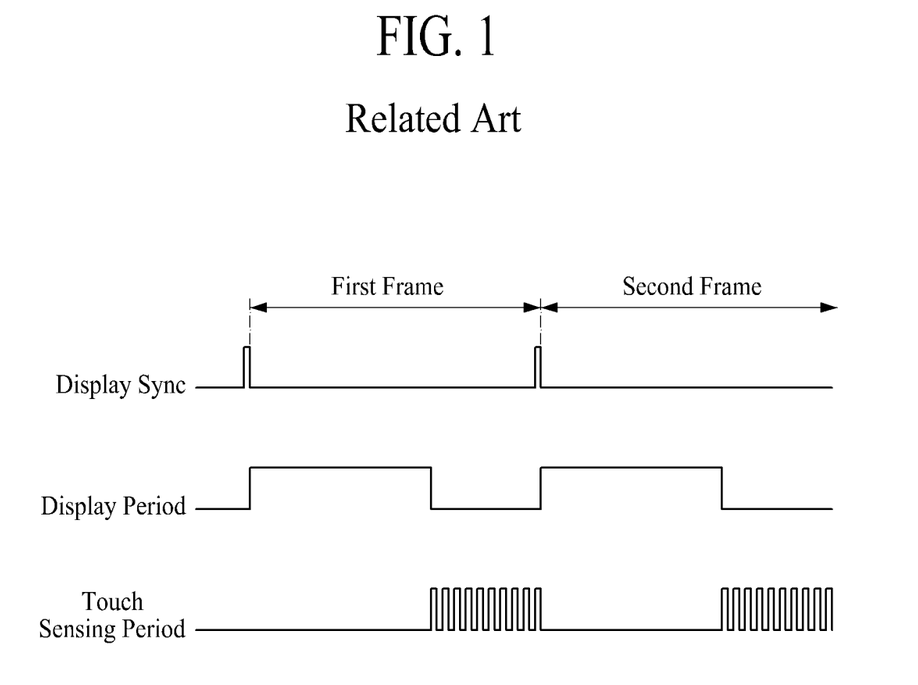
FIG. 1 is a timing chart showing signals during a display period and a touch sensing period based on one vertical sync signal, in a general display device with integrated touch screen.

FIG. 1 is a timing chart showing signals during a display period and a touch sensing period based on one vertical sync signal, in a general display device with integrated touch screen.

In the general display device with integrated self-capacitive and in-cell type touch screen, as shown in FIG. 1, the display period and the touch sensing period are time-divided and driven according to the sync signal during one frame.

For example, a plurality of electrodes receive a common voltage to perform a display driving operation in the display period in units of a frame, and in the touch sensing period, the plurality of electrodes receive a touch sensing signal to perform a touch driving operation.

When the general display device with integrated touch screen is a high-resolution display device, the number of data to input increases in the display driving operation, and for this reason, time for the display driving operation also increases. On the other hand, time for the touch driving operation is insufficient.

SUMMARY

Accordingly, the present invention is directed to provide display device with integrated touch screen and a driving method thereof that substantially obviate one or more problems due to limitations and disadvantages of the related art.

An aspect of the present invention is directed to provide a display device with integrated touch screen, which can increase a display driving time and reduce a touch driving time.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, there is provided a display device with integrated touch screen including: a panel configured to include a plurality of electrodes that are divided into n number of groups (where n is an integer equal to or more than two); a display driver IC configured to, apply a common voltage to the plurality of electrodes during a display driving mode of a first frame, apply a touch scan signal to a first group of the n groups and a first adjacent electrode unit included in a second group adjacent to the first group during a touch driving mode of the first frame, apply the common voltage to the plurality of electrodes during the display driving mode of a second frame, and apply the touch scan signal to the second group and a second adjacent electrode unit included in the first group adjacent to the second group during the touch driving mode of the second frame; and a touch IC configured to generate the touch scan signal, and apply the touch scan signal to the display driver IC.

In another aspect of the present invention, there is provided a method of driving a display device with integrated touch screen, which includes: a panel configured to include a plurality of electrodes that are divided into n number of groups (where n is an integer equal to or more than two); a display driver IC that applies a common voltage or a touch scan signal to the plurality of electrodes; and a touch IC configured to generate the touch scan signal, and apply the touch scan signal to the display driver IC, including: applying the common voltage to the plurality of electrodes during a display driving mode of a first frame; applying the touch scan signal to a first group of the n groups and a first adjacent electrode unit included in a second group adjacent to the first group, during a touch driving mode of the first frame; applying the common voltage to the plurality of electrodes during the display driving mode of a second frame; and applying the touch scan signal to the second group and a second adjacent electrode unit included in the first group adjacent to the second group, during the touch driving mode of the second frame.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE INVENTION

Reference will now be made in detail to the exemplary embodiments of the present invention, examples of which are illustrated in the accompanying drawings. Wherever possible, the same reference numbers will be used throughout the drawings to refer to the same or like parts.

Hereinafter, embodiments of the present invention will be described in detail with reference to the accompanying drawings.

In the following description, for convenience of a description, a display device with integrated touch screen according to embodiments of the present invention will be exemplarily described as being an LCD device, but the present invention is not limited thereto. The present invention may be applied to various display devices such as FEDs, PDPs, ELDs, and EPDs. Also, a description on the general configuration of an LCD device is not provided.

In a display device with integrated touch screen according to an embodiment of the present invention, a plurality of electrodes are divided into n number of groups, and a touch scan signal is sequentially applied to the n groups. However, for convenience of a description, the below description will be made on a method where the electrodes are divided into two groups. Therefore, the present invention is not limited to the method where the electrodes are divided into the two groups, and the electrodes may be divided into three or more groups.

Figure 2:
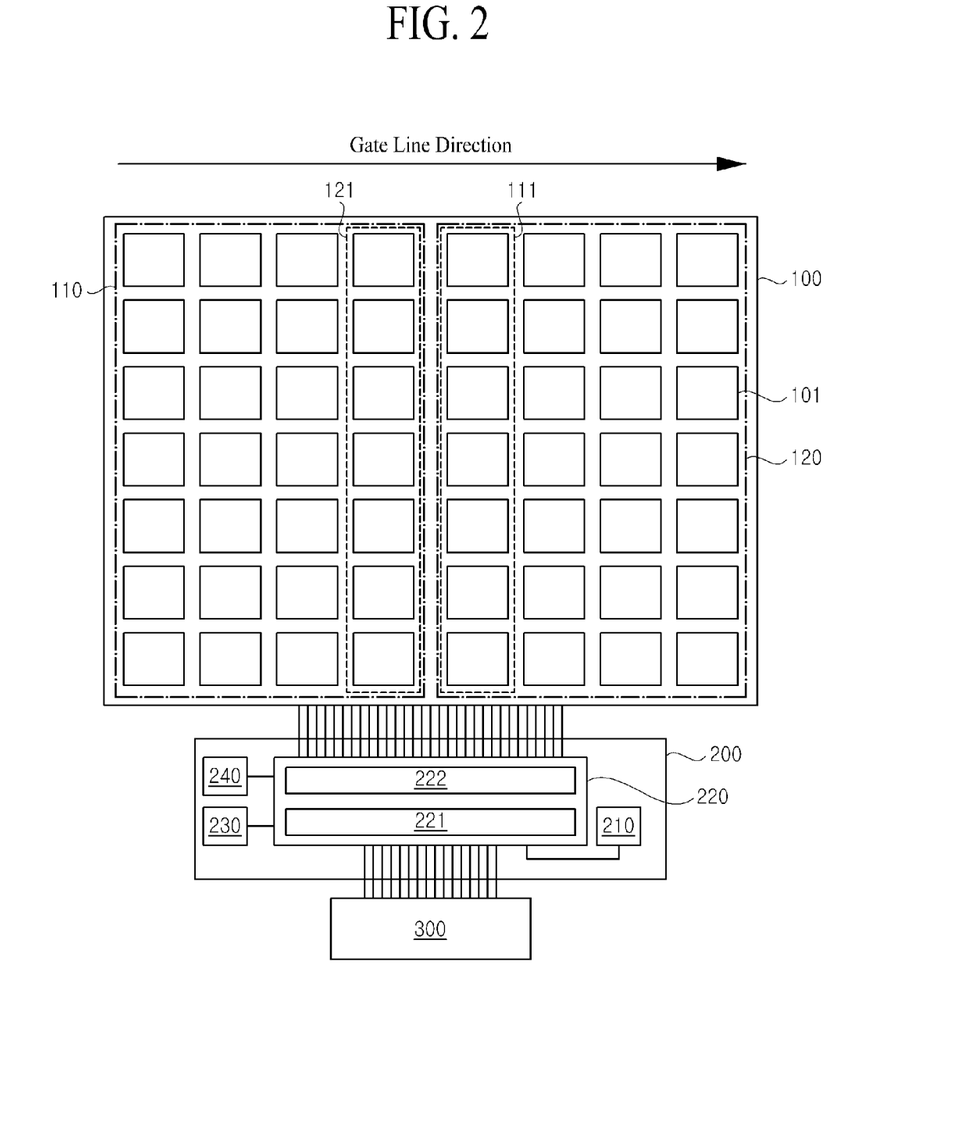
FIG. 2 is a diagram illustrating a configuration of a display device with integrated touch screen according to an embodiment of the present invention.
Figure 3:
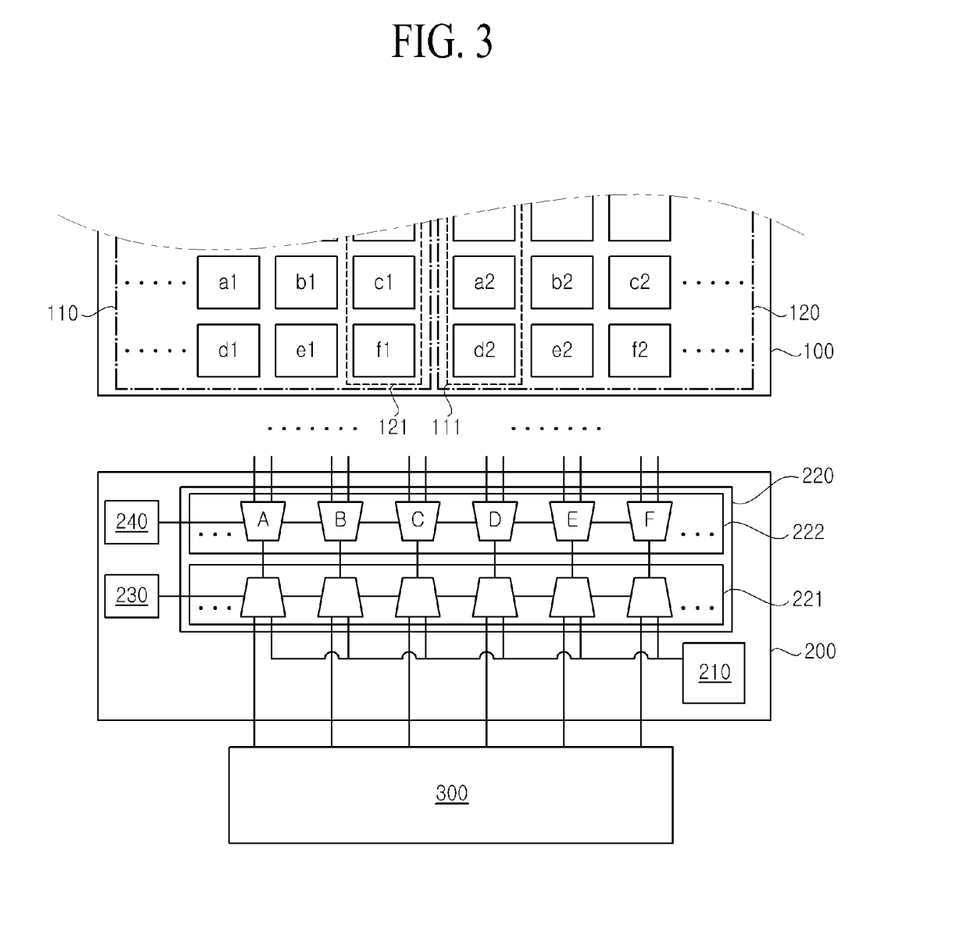
FIG. 3 is a diagram illustrating, in detail, a connection relationship between a panel and a display driver integrated circuit (IC) of the display device with integrated touch screen according to an embodiment of the present invention.

FIG. 2 is a diagram illustrating a configuration of a display device with integrated touch screen according to an embodiment of the present invention, and FIG. 3 is a diagram illustrating, in detail, a connection relationship between a panel and a display driver IC of the display device with integrated touch screen according to an embodiment of the present invention.

The display device with integrated touch screen according to an embodiment of the present invention, as illustrated in FIG. 2, includes a panel 100, a display driver IC 200, and a touch IC 300.

First, the panel 100 includes a built-in touch screen (not shown), which detects a touch position of a user. In particular, the touch screen applied to the present invention is a self-capacitive and in-cell type touch screen in which a display driving operation and a touch driving operation are temporally divided and performed.

The panel 100 may be configured as a type in which a liquid crystal layer is formed between two substrates. In this case, a plurality of gate lines, a plurality of data lines intersecting the gate lines, a plurality of thin film transistors (TFTs) that are respectively formed in a plurality of areas defined by intersections between the data lines and the gate lines, and a plurality of pixels (which are arranged in a matrix type due to an intersection structure of the data lines and the gate lines) are disposed on a lower substrate of the panel 100.

The panel 100 includes a plurality of electrodes 101, which are divided into two groups, and a plurality of lines.

The plurality of electrodes 101 are formed in a pixel area of the panel 100 to overlap a plurality of pixel electrodes. In other words, the plurality of electrodes 101 are not formed in each pixel but are formed in an area overlapping a plurality of pixels.

When a driving mode of the panel 100 is a display driving mode, each of the electrodes 101 acts as a common electrode, which drives a liquid crystal, along with a pixel electrode formed in a corresponding pixel. When the driving mode of the panel 100 is a touch driving mode, each of the electrodes 101 acts as a touch electrode, which detects a touch position, according to a touch scan signal applied from the touch IC 300.

The plurality of electrodes 101 are divided into a first group 110 and a second group 120, and may be divided in a gate line direction or a data line direction. The first group 110 includes a second adjacent electrode unit 121, and the second group 120 includes a first adjacent electrode unit 111.

Here, the first adjacent electrode unit 111 is defined as an electrode string that is formed in an area of the second group 120 adjacent to the first group 110, and the number of electrodes of the first adjacent electrode unit 111 according to an embodiment of the present invention may be one-tenth to half of the number of electrodes included in the second group 120. Alternatively, the first adjacent electrode unit 111 may be an outermost electrode string of the second group 120 adjacent to the first group 110.

Similarly, the second adjacent electrode unit 121 is defined as an electrode string that is formed in an area of the first group 110 adjacent to the second group 120, and the number of electrodes of the second adjacent electrode unit 121 according to an embodiment of the present invention may be one-tenth to half of the number of electrodes included in the first group 110. Alternatively, the second adjacent electrode unit 121 may be an outermost electrode string of the first group 110 adjacent to the second group 120.

A plurality of lines connect the plurality of electrodes 101 to the display driver IC 200, respectively. Therefore, a common voltage and a touch scan signal which are output from the display driver IC 200 are applied to the plurality of electrodes 101 through the respective lines.

Subsequently, the display driver IC 200 applies the common voltage to the plurality of electrodes 101, or applies the touch scan signal to the plurality of electrodes 101 included in each of the two divided groups, according to the driving mode of the panel 100.

In other words, during the display driving mode, the display driver IC 200 applies the common voltage to the plurality of electrodes 101. During the touch driving mode, the display driver IC 200 applies the touch scan signal to the first group 110 and the first adjacent electrode unit 111, and applies the touch scan signal to the second group 120 and the second adjacent electrode unit 121.

For example, during the display driving mode of a first frame, the display driver IC 200 applies the common voltage to the plurality of electrodes, and during the touch driving mode of the first frame, the display driver IC 200 applies the touch scan signal to the first group 110 of the two groups and the first adjacent electrode unit 111 included in the second group 120 adjacent to the first group 110. During the display driving mode of a second frame, the display driver IC 200 applies the common voltage to the plurality of electrodes, and during the touch driving mode of the second frame, the display driver IC 200 applies the touch scan signal to the second group 120 of the two groups and the second adjacent electrode unit 121 included in the first group 110 adjacent to the second group 120.

Here, the reason that the display driver IC 200 simultaneously applies the touch scan signal to the first group 110 and the first adjacent electrode unit 111 or simultaneously applies the touch scan signal to the second group 120 and the second adjacent electrode unit 121 is because in electrodes disposed at a boundary surface between adjacent groups in the two divided groups, when the touch scan signal is applied to the adjacent groups but the electrodes cannot receive the touch scan signal at the same time, there is a possibility that a difference occurs in a touch sensitivity for touch sensing. Therefore, the display drive IC 200 simultaneously applies the touch scan signal to a group and a boundary surface between the groups and a group adjacent thereto.

Therefore, the touch scan signal that is applied to the first adjacent electrode unit 111 and the second adjacent electrode unit 121 may be a touch scan signal for touch sensing, or may be a dummy touch scan signal for reducing a touch sensitivity of an adjacent group, instead of touch sensing.

The display driver IC 200, as illustrated in FIG. 3, may drive the plurality of electrodes 101 as common electrodes or touch electrodes, and include a common voltage generator 210, a switching unit 220, a sync signal generator 230, and a switching control signal generator 240.

The common voltage generator 210 generates the common voltage (Vcom), and applies the common voltage to the switching unit 220.

When the driving mode of the panel 100 is the display driving mode, the common voltage generator 210 generates the common voltage which is to be applied to the plurality of electrodes so as to output an image, and applies the common voltage to the switching unit 220.

The sync signal generator 230 generates a sync signal indicating the driving mode of the panel 100.

For example, when the driving mode of the panel 100 is the display driving mode, the sync signal generator 230 generates a sync signal that allows the common voltage generated by the common voltage generator 210 to be applied to the plurality of electrodes 101 through the switching unit 220, and allows the touch scan signal to be applied to the plurality of electrodes 101.

The switching control signal generator 240 generates a control signal that allows the common voltage generator 210 to be connected to the plurality of electrodes 101, or allows the touch IC 300 to be connected to the electrodes included in the first group 110 and the electrodes included in the first adjacent electrode unit 111 and allows the touch IC 300 to be connected to the electrodes included in the second group 120 and the electrodes included in the second adjacent electrode unit 121, according to the sync signal of the sync signal generator 230.

The switching unit 220 may be configured with a plurality of first switching units 221 and a plurality of switching units 222, and may apply the common voltage and the touch scan signal to the electrodes 101 according to the sync signal and the control signal.

Moreover, the switching unit 220 may simultaneously apply the common voltage to the plurality of electrodes 101, or may apply the touch scan signal to the first group 110, the first adjacent electrode unit 111, the second group 120, and the second adjacent electrode unit 121, according to the sync signal of the sync signal generator 230 and the control signal of the switching control signal generator 240.

Here, as illustrated in FIG. 3, the plurality of first switching units 221 receive the sync signal from the sync signal generator 230 to connect the plurality of second switching units 222 to the common voltage generator 210 or the touch IC 300. That is, when the sync signal of the sync signal generator 230 is a sync signal indicating the display driving mode, the plurality of first switching units 221 connect the plurality of second switching units 222 to the common voltage generator 210, and when the sync signal of the sync signal generator 230 is a sync signal indicating the touch driving mode, the plurality of first switching units 221 connect the plurality of second switching units 222 to the touch IC 300. The plurality of first switching units 221 may include a 2:1 multiplexer.

The plurality of second switching units 222 receive the control signal from the switching control signal generator 240 to connect the plurality of first switching units 221 to the plurality of electrodes or to connect the plurality of first switching units 221 to the electrodes included in the first group 110, the electrodes included in the first adjacent electrode unit 111, the electrodes included in the second group 120, and the electrodes included in the second adjacent electrode unit 121. That is, when the control signal of the switching control signal generator 240 is a control signal based on the sync signal indicating the display driving mode, the plurality of second switching units 222 connect the plurality of first switching units 221 to the plurality of electrodes, and when the control signal of the switching control signal generator 240 is a control signal based on the sync signal indicating the touch driving mode, the plurality of second switching units 222 connect the plurality of first switching units 221 to the first group 110 and the first adjacent electrode unit 111 during the first frame, and connect the plurality of first switching units 221 to the second group 120 and the second adjacent electrode unit 121 during the second frame.

For example, as illustrated in FIG. 3, when the control signal of the switching control signal generator 240 is a control signal based on the sync signal indicating the display driving mode, during the display driving mode, a second switching unit A is connected to electrodes a1 and a2, a second switching unit B is connected to electrodes b1 and b2, a second switching unit C is connected to electrodes c1 and c2, a second switching unit D is connected to electrodes d1 and d2, a second switching unit E is connected to electrodes e1 and e2, and a second switching unit F is connected to electrodes f1 and f2.

For example, when the control signal of the switching control signal generator 240 is a control signal based on the sync signal indicating the touch driving mode, during the touch driving mode of the first frame, the second switching unit A is connected to the electrodes a1 and a2, the second switching unit B is connected to the electrode b1, the second switching unit C is connected to the electrode c1, the second switching unit D is connected to the electrodes d1 and d2, the second switching unit E is connected to the electrode e1, and the second switching unit F is connected to the electrode f1, and during the touch driving mode of the second frame, the second switching unit A is connected to the electrode a2, the second switching unit B is connected to the electrode b2, the second switching unit C is connected to the electrodes c1 and c2, the second switching unit D is connected to the electrode d2, the second switching unit E is connected to the electrode e2, and the second switching unit F is connected to the electrodes f1 and f2.

Referring again to FIG. 2, the touch IC 300 applies the touch scan signal to the plurality of electrodes 101 through the display driver IC 200, and then senses a capacitance change of each of the electrodes 101 to determine whether each electrode is touched.

For example, the touch IC 300 according to an embodiment of the present invention may include a touch scan signal generator that generates the touch scan signal which is to be supplied to the plurality of electrodes of the panel 100 for touch sensing. The touch scan signal may be a touch driving voltage, which may have a value higher than the common voltage applied to the plurality of electrodes of the panel 100 for display driving. In this case, the touch driving voltage may have a voltage corresponding to the common voltage as a low-level voltage, and have a voltage higher than the common voltage as a high-level voltage.

Moreover, the touch IC 300 according to an embodiment of the present invention may include a touch sensing unit that receives a plurality of touch sensing signals from the respective electrodes 101, and calculates touch coordinates by using the touch sensing signals to sense a user's touch. Here, the calculated touch coordinates are transferred to a system unit of the display device, and are used to detect a touch position of the user in the panel 100.

Hereinafter, a display device with integrated touch screen according to another embodiment of the present invention will be described in detail with reference to FIGS. 4 and 5.

Figure 4:
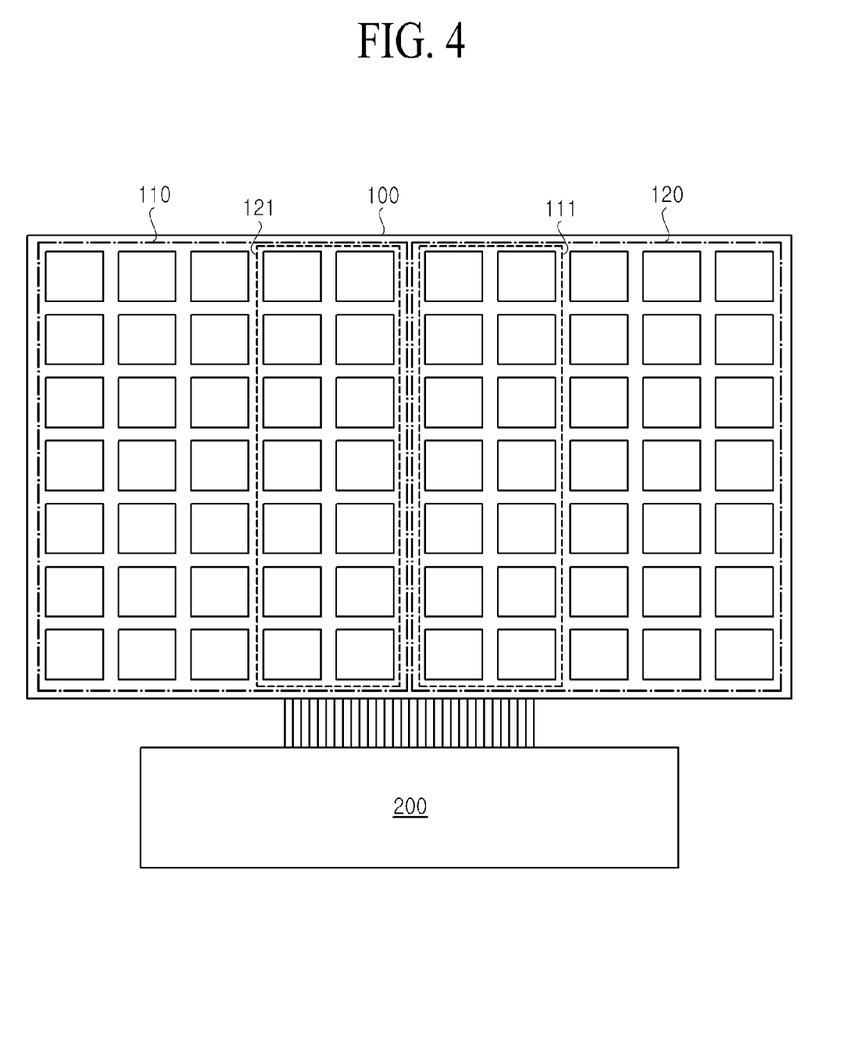
FIG. 4 is a diagram illustrating, in detail, a connection relationship between a panel and a display driver IC of a display device with integrated touch screen according to another embodiment of the present invention.
Figure 5:
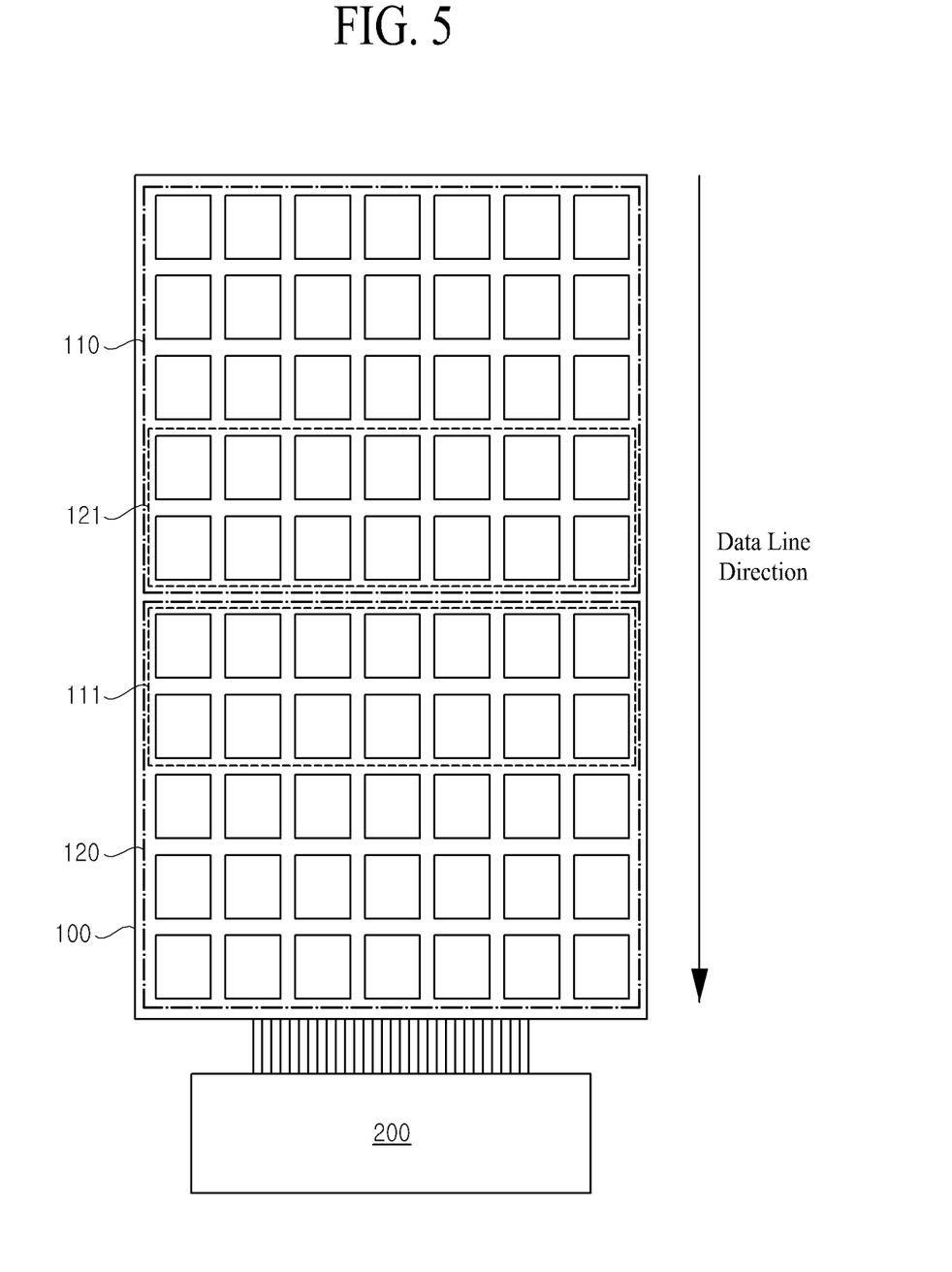
FIG. 5 is a diagram illustrating, in detail, a connection relationship between a panel and a display driver IC of a display device with integrated touch screen according to another embodiment of the present invention.

FIG. 4 illustrates an embodiment of an adjacent electrode unit different from the adjacent electrode unit according to an embodiment of the present invention, and FIG. 5 illustrates an embodiment of an adjacent electrode unit different from the adjacent electrode unit according to an embodiment of the present invention.

In describing the embodiment of FIG. 4 and the embodiment of FIG. 5, the elements other than a display driver panel 100 have been described in detail with reference to FIGS. 2 and 3, and thus, their detailed descriptions are not provided.

A first adjacent electrode unit 111 of the display device with integrated touch screen according to another embodiment of the present invention, as illustrated in FIG. 4, is defined as an electrode string that is formed in an area of a second group 120 adjacent to a first group 110, and the number of electrodes of the first adjacent electrode unit 111 according to another embodiment of the present invention may be one-tenth to half of the number of electrodes included in the second group 120. Alternatively, the first adjacent electrode unit 111 may be an outermost electrode string of the second group 120 adjacent to the first group 110 and an electrode string that is adjacent to the outermost electrode string in a second group direction.

Similarly, a second adjacent electrode unit 121 is defined as an electrode string that is formed in an area of the first group 110 adjacent to the second group 120, and the number of electrodes of the second adjacent electrode unit 121 according to an embodiment of the present invention may be one-tenth to half of the number of electrodes included in the first group 110. Alternatively, the second adjacent electrode unit 111 may be an outermost electrode string of the first group 110 adjacent to the second group 120 and an electrode string that is adjacent to the outermost electrode string in a first group direction.

Subsequently, as illustrated in FIG. 5, the electrode groups 110 and 120 of the display device with integrated touch screen according to another embodiment of the present invention may be electrode groups that are divided in a data line direction.

A display driver IC 200 according to another embodiment of the present invention applies the common voltage to the plurality of electrodes 101, or applies the touch scan signal to the two groups 110 and 120 that are divided in the data line direction, according to the driving mode of the panel 100.

In other words, during the display driving mode, the display driver IC 200 applies the common voltage to the plurality of electrodes 101, and during the touch driving mode, the display driver IC 200 applies the touch scan signal to the first group 110, the first adjacent electrode unit 111, the second group 120, and the second adjacent electrode unit 121.

Here, the first adjacent electrode unit 111 may be the outermost electrode string of the second group 120 adjacent to the first group 110, or may be the outermost electrode string of the second group 120 and an electrode string that is adjacent to the outermost electrode string in a second group direction. Also, the second adjacent electrode unit 121 may be the outermost electrode string of the first group 110 adjacent to the second group 120, or may be the outermost electrode string of the first group 110 and an electrode string that is adjacent to the outermost electrode string in the first group direction.

For example, during the display driving mode of a first frame, the display driver IC 200 applies the common voltage to the plurality of electrodes, and during the touch driving mode of the first frame, the display driver IC 200 applies the touch scan signal to the first group 110 of the two groups and the first adjacent electrode unit 111 included in the second group 120 adjacent to the first group 110. During the display driving mode of a second frame, the display driver IC 200 applies the common voltage to the plurality of electrodes, and during the touch driving mode of the second frame, the display driver IC 200 applies the touch scan signal to the second group 110 of the two groups and the second adjacent electrode unit 121 included in the first group 110 adjacent to the second group 120.

Hereinafter, a method of driving the above-described display device with integrated touch screen will be described in detail with reference to FIGS. 2, 3 and 6.

Figure 6:
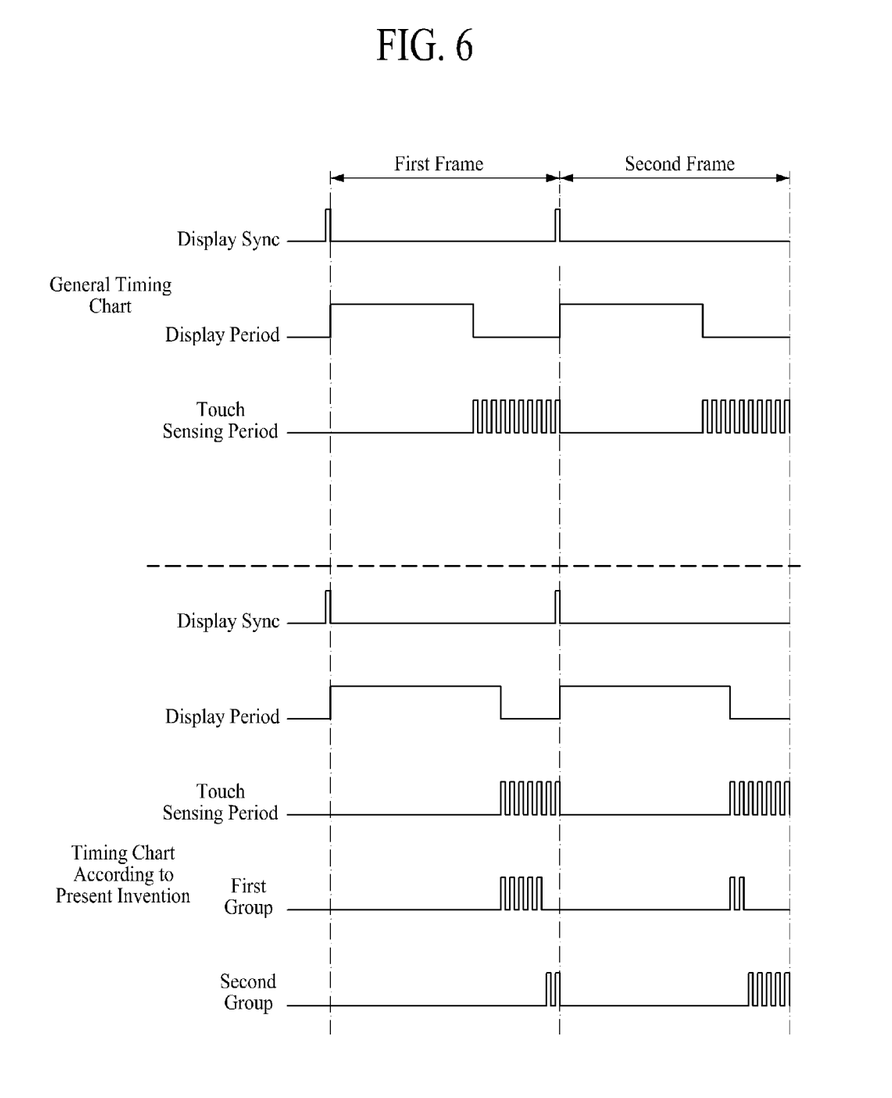
FIG. 6 is a timing chart showing signals during a display period and a touch sensing period based on one vertical sync signal, in a display device with integrated touch screen according to various embodiments of the present invention.

FIG. 6 is a timing chart showing signals during a display period and a touch sensing period based on one vertical sync signal, in a display device with integrated touch screen according to various embodiments of the present invention.

Referring again to FIGS. 2 and 3, the display device with integrated touch screen according to an embodiment of the present invention includes the panel that includes the plurality of electrodes which are divided into the two groups, the display driver IC that applies the common voltage or the touch scan signal to the plurality of electrodes, and the touch IC that generates the touch scan signal and applies the touch scan signal to the display driver IC. In particular, the two groups may be groups that are divided in the data line direction.

First, the display device performs an operation which, during the display driving mode of the first frame, applies the common voltage to the plurality of electrodes, and during the touch driving mode of the first frame, applies the touch scan signal to the first group 110 of the two groups and the first adjacent electrode unit 111 included in the second group 120 adjacent to the first group 110. Here, the first adjacent electrode unit 111 is defined as an electrode string that is formed in an area of a second group 120 adjacent to a first group 110, and the number of electrodes of the first adjacent electrode unit 111 according to an embodiment of the present invention may be one-tenth to half of the number of electrodes included in the second group 120. Alternatively, the first adjacent electrode unit 111 may be an outermost electrode string of the second group 120 adjacent to the first group 110, or the first adjacent electrode unit 111 may be an outermost electrode string of the second group 120 adjacent to the first group 110 and an electrode string that is adjacent to the outermost electrode string in the second group direction.

Subsequently, the display device performs an operation which, during the display driving mode of a second frame, applies the common voltage to the plurality of electrodes, and during the touch driving mode of the second frame, applies the touch scan signal to the second group 110 of the two groups and the second adjacent electrode unit 121 included in the first group 110 adjacent to the second group 120. Here, the second adjacent electrode unit 121 is defined as an electrode string that is formed in an area of the first group 110 adjacent to the second group 120, and the number of electrodes of the second adjacent electrode unit 121 according to an embodiment of the present invention may be one-tenth to half of the number of electrodes included in the first group 110. Alternatively, the second adjacent electrode unit 121 may be an outermost electrode string of the first group 110 adjacent to the second group 120, or the second adjacent electrode unit 111 may be an outermost electrode string of the first group 110 adjacent to the second group 120 and an electrode string that is adjacent to the outermost electrode string in the first group direction.

To summarize the display device with integrated touch screen according to an embodiment of the present invention with reference to FIG. 6, the display driving period according to the present invention is relatively longer, and the touch sensing period according to the present invention is relatively shorter, in comparison with general display devices with integrated touch screen.

Moreover, during the touch sensing period of the first frame, the display device with integrated touch screen according to an embodiment of the present invention applies the touch scan signal to all the electrodes included in the first group, and applies the touch scan signal to only some electrodes which are included in the second group and are adjacent to the first group. Furthermore, during the touch sensing period of the second frame, the display device with integrated touch screen according to an embodiment of the present invention applies the touch scan signal to all the electrodes included in the second group, and applies the touch scan signal to only some electrodes which are included in the first group and are adjacent to the second group.

Here, the reason that the display device with integrated touch screen according to an embodiment of the present invention applies the touch scan signal to all the electrodes included in the first group and some electrodes which are included in the second group and are adjacent to the first group, or applies the touch scan signal to all the electrodes included in the second group and some electrodes which are included in the first group and are adjacent to the second group is because in electrodes disposed at a boundary surface between adjacent groups in the two divided groups, when the touch scan signal is applied to the adjacent groups but the electrodes cannot receive the touch scan signal at the same time, there is a possibility that a difference occurs in a touch sensitivity for touch sensing.

According to various embodiments of the present invention, the display device with integrated touch screen can stably secure a display driving time when driving a high-resolution panel.

Moreover, according to various embodiments of the present invention, the display device with integrated touch screen can minimize a possibility of an error which is caused by a touch sensitivity and occurs at the boundaries of the touch electrodes which are divided into the groups.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A display device with integrated touch screen, the display device comprising:
   a panel configured to include a plurality of electrodes that are divided into n number of groups (where n is an integer equal to or more than two);
   a display driver circuit configured to, apply a common voltage to the plurality of electrodes during a display driving mode of a first frame, apply a touch scan signal to a first group of the n groups and a first adjacent electrode unit included in a second group adjacent to the first group during a touch driving mode of the first frame, wherein the first adjacent electrode unit includes an outermost electrode string of the second group adjacent to the first group, the outermost electrode string of the second group including at least a first outermost electrode and a second outermost electrode of the second group that are configured such that the touch scan signal is applied to the first outermost electrode via a first signal line and to the second outermost electrode via a second signal line that is separate from the first signal line, apply the common voltage to the plurality of electrodes during the display driving mode of a second frame, and apply the touch scan signal to the second group and a second adjacent electrode unit included in the first group adjacent to the second group during the touch driving mode of the second frame; and
   a touch circuit configured to generate the touch scan signal.

2. The display device of claim 1, wherein number of electrodes of the first adjacent electrode unit is one-tenth to half of number of the electrodes included in the second group.

3. The display device of claim 1, wherein the first adjacent electrode unit further comprises:
   an electrode string adjacent to the outermost electrode string in a second group direction.

4. The display device of claim 1, wherein the n groups are divided in a data line direction.

5. The display device of claim 1, wherein,
   when the driving mode is the display driving mode, the plurality of electrodes act as common electrodes, and
   when the driving mode is the touch driving mode, the plurality of electrodes act as touch electrodes.

6. The display device of claim 1, wherein the display driver circuit comprises:

a common voltage generator configured to generate the common voltage;

a sync signal generator configured to generate a sync signal indicating the driving mode;

a switching control signal generator configured to generate a control signal that allows the common voltage generator to be connected to the plurality of electrodes, or allows the touch circuit to be connected to the electrodes included in the first group and the electrodes included in the first adjacent electrode unit and allows the touch circuit to be connected to the electrodes included in the second group and the electrodes included in the second adjacent electrode unit; and a switching unit configured to operate according to the sync signal and the control signal.

7. The display device of claim 6, wherein the switching unit comprises a first switching unit and a second switching unit, the first switching unit receiving the sync signal of the sync signal generator to connect the second switching unit to the common voltage generator or the touch circuit, and the second switching unit receiving the control signal of the switching control signal generator to connect the first switching unit to the plurality of electrodes or to connect the first switching unit to the electrodes included in the first group, the electrodes included in the first adjacent electrode unit, the electrodes included in the second group, and the electrodes included in the second adjacent electrode unit.

8. A method of driving a display device with integrated touch screen, which includes: a panel configured to include a plurality of electrodes that are divided into n number of groups (where n is an integer equal to or more than two); a display driver circuit that applies a common voltage or a touch scan signal to the plurality of electrodes; and a touch circuit configured to generate the touch scan signal, the method comprising:

applying the common voltage to the plurality of electrodes during a display driving mode of a first frame;

applying the touch scan signal to a first group of the n groups and a first adjacent electrode unit included in a second group adjacent to the first group, during a touch driving mode of the first frame, wherein the first adjacent electrode unit includes an outermost electrode string of the second group adjacent to the first group, the outermost electrode string of the second group including at least a first outermost electrode and a second outermost electrode of the second group that are configured such that the touch scan signal is applied to the first outermost electrode via a first signal line and to the second outermost electrode via a second signal line that is separate from the first signal line;

applying the common voltage to the plurality of electrodes during the display driving mode of a second frame; and applying the touch scan signal to the second group and a second adjacent electrode unit included in the first group adjacent to the second group, during the touch driving mode of the second frame.

9. The method of claim 8, wherein number of electrodes of the first adjacent electrode unit is one-tenth to half of number of the electrodes included in the second group.

10. The method of claim 8, wherein the first adjacent electrode unit further comprises:

an electrode string adjacent to the outermost electrode string in a second group direction.

11. The method of claim 8, wherein the n groups are divided in a data line direction.

12. A display device with integrated touch screen, the display device comprising:

a panel including a plurality of electrodes that are grouped into multiple groups including at least a first group of electrodes and a second group of electrodes; and a display driver circuit configured to:

apply a common voltage to the plurality of electrodes during a display period of a first frame; and apply a touch drive signal to the first group of electrodes and a first adjacent group of electrodes during a touch period of the first frame, the first adjacent group of electrodes including either one string or two strings of the electrodes of the second group of electrodes that are adjacent to the first group of electrodes, the one string or each of the two strings of the electrodes of the second group including at least a first electrode and a second electrode of the second group that are configured such that the touch scan signal is applied to the first electrode via a first signal line and to the second electrode via a second signal line that is separate from the first signal line.

13. The display device of claim 12, wherein the display drive circuit is further configured to:

apply the common voltage to the plurality of electrodes during a display period of a second frame; and apply the touch drive signal to the second group of electrodes and a second adjacent group of electrodes during a touch period of the second frame, the second adjacent group of electrodes comprised of a subset of the first group of electrodes that are adjacent to the second group of electrodes.

14. The display device of claim 12, wherein the display driver circuit comprises:

a synchronization signal generation circuit to generate a synchronization signal indicative of the display period and the touch period; and a switching circuit to connect the common voltage to the plurality of electrodes during the display period, or connect the touch drive signal to the first group of electrodes and the first adjacent group of electrodes during the touch period according to a switch control signal.

15. The display device of claim 14, wherein the switching circuit comprises a first set of switches and a second set of switches coupled to the first set of switches, wherein:

the first set of switches are configured to connect either the common voltage or the touch drive signal to the second set of switches according to the synchronization signal; and the second set of switches are configured to connect the common voltage to the plurality of electrodes during the display period, or connect the touch drive signal to the first group of electrodes and the first adjacent group of electrodes during the touch period according to the switch control signal.

16. The display device of claim 12, wherein the display driver circuit includes circuitry to generate the touch drive signal.

17. A display driver circuit for driving a display device with integrated touch screen, the display device comprising a panel including a plurality of electrodes that are grouped into multiple groups, the multiple groups including at least a first group of electrodes and a second group of electrodes, the display driver circuit comprising:

a switching circuit configured to:

apply a common voltage to the plurality of electrodes during a display period of a first frame; and apply a touch drive signal to the first group of electrodes and a first adjacent group of electrodes during a touch period of the first frame, the first adjacent group of electrodes including either one string or two strings of the electrodes of the second group of electrodes that are adjacent to the first group of electrodes, the one string or each of the two strings of the electrodes of the second group including at least a first electrode and a second electrode of the second group that are configured such that the touch scan signal is applied to the first electrode via a first signal line and to the second electrode via a second signal line that is separate from the first signal line.

18. The display driver circuit of claim 17, wherein the switching circuit is further configured to:
apply the common voltage to the plurality of electrodes during a display period of a second frame; and
apply the touch drive signal to the second group of electrodes and the second adjacent group of electrodes during a touch period of the second frame, the second adjacent group of electrodes comprised of a subset of the first group of electrodes that are adjacent to the second group of electrodes.

19. The display driver circuit of claim 17, further comprising a synchronization signal generation circuit to generate a synchronization signal indicative of the display period and the touch period.

20. The display driver circuit of claim 19, wherein the switching circuit comprises a first set of switches and a second set of switches coupled to the first set of switches, wherein:
the first set of switches are configured to connect either the common voltage or the touch drive signal to the second set of switches according to the synchronization signal; and
the second set of switches are configured to connect the common voltage to the plurality of electrodes during the display period, or connect the touch drive signal to the first group of electrodes and the first adjacent group of electrodes during the touch period according to the switch control signal.

21. The display driver circuit of claim 17, further comprising circuitry to generate the touch drive signal.

22. A method for driving a display device with integrated touch screen, the display device comprising a panel including a plurality of electrodes that are grouped into multiple groups, the multiple groups including at least a first group of electrodes and a second group of electrodes, the method comprising:
applying a common voltage to the plurality of electrodes during a display period of a first frame; and
applying a touch drive signal to the first group of electrodes and a first adjacent group of electrodes during a touch period of the first frame, the first adjacent group of electrodes including either one string or two strings of the electrodes of the second group of electrodes that are adjacent to the first group of electrodes, the one string or each of the two strings of the electrodes of the second group including at least a first electrode and a second electrode of the second group that are configured such that the touch scan signal is applied to the first electrode via a first signal line and to the second electrode via a second signal line that is separate from the first signal line.

23. The method of claim 22, further comprising:
applying the common voltage to the plurality of electrodes during a display period of a second frame;
applying the touch drive signal to the second group of electrodes and the second adjacent group of electrodes during a touch period of the second frame, the second adjacent group of electrodes comprised of a subset of the first group of electrodes that are adjacent to the second group of electrodes.

* * * * *